(12) United States Patent
Shapiro

(10) Patent No.: US 8,578,106 B1
(45) Date of Patent: Nov. 5, 2013

(54) METHOD AND SYSTEM FOR QUEUE DEMULTIPLEXOR WITH SIZE GROUPING

(71) Applicant: Michael W. Shapiro, San Francisco, CA (US)

(72) Inventor: Michael W. Shapiro, San Francisco, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/673,348

(22) Filed: Nov. 9, 2012

(51) Int. Cl.
*G06F 13/00* (2006.01)
*G06F 9/26* (2006.01)

(52) U.S. Cl.
USPC ........... 711/154; 711/119; 711/203; 711/210; 711/212

(58) Field of Classification Search
USPC ............. 711/5, 100, 118, 119, 149, 154, 203, 711/210, 212, E12.047, E12.048, E12.056
See application file for complete search history.

(56) References Cited

U.S. PATENT DOCUMENTS

| 8,364,869 B2 * | 1/2013 | Arakawa et al. ................. 710/62 |
| 2010/0131734 A1 * | 5/2010 | Clegg et al. ................... 711/170 |
| 2012/0060010 A1 * | 3/2012 | Shimozono et al. .......... 711/165 |

* cited by examiner

*Primary Examiner* — Tuan Thai
*Assistant Examiner* — Zhuo Li
(74) *Attorney, Agent, or Firm* — Osha Liang LLP

(57) ABSTRACT

A method for writing data to submission queues in a storage controller including receiving an input/output (I/O) request from a client application, where the client application is associated with a virtual port and where the virtual port is associated with a physical port. The method further includes determining a size of the I/O request, identifying a queue group based on the size of the I/O request and the virtual port, where the queue group includes submission queues and is associated with the virtual port. The method further includes identifying a submission queue, sending the I/O request to a storage controller over the physical port, where the queue group is located in memory operatively connected to the storage controller and where the storage controller is configured to place the I/O request in the submission queue.

14 Claims, 8 Drawing Sheets

METHOD AND SYSTEM FOR QUEUE DEMULTIPLEXOR WITH SIZE GROUPING

BACKGROUND

Storage controllers typically include one submission queue per physical port that connects a client to the storage controller. In order to process I/O requests, the storage controller includes logic to schedule and execute the I/O requests received through the submission queues. Since all requests from a particular client are received through the submission queue for that client's physical port, the re-ordering and scheduling of I/O requests is solely handled by the storage controller after the I/O requests are submitted.

SUMMARY

In general, in one aspect, the invention relates to a method for writing data to submission queues in a storage controller. The method includes receiving an input/output (I/O) request from a client application, wherein the client application is associated with a virtual port and wherein the virtual port is associated with a physical port, determining a size of the I/O request, identifying a queue group based on the size of the I/O request and the virtual port, wherein the queue group consists of a plurality of submission queues, wherein the queue group is associated with the virtual port, identifying a submission queue in the plurality of submission queues, wherein the submission queue is not full, sending the I/O request to a storage controller over the physical port, wherein the queue group is located in memory operatively connected to the storage controller, wherein the storage controller is configured to place the I/O request in the submission queue.

In general, in one aspect, the invention relates to a storage controller. The storage controller includes a memory comprising a first queue group associated with a first virtual port and comprising a first plurality of submission queues each associated with a first queue depth and a first I/O size range, a second queue group associated with a second virtual port and comprising a second plurality of submission queues each associated with a second queue depth and a second I/O size range, wherein the storage controller is configured to: receive an I/O request and submission queue information from a client application over a physical port, wherein the client application is associated with the first virtual port, and place the I/O request in the submission queue based on the submission queue information, wherein the submission queue is one of the first plurality of submission queues.

Other aspects of the invention will be apparent from the following description and the appended claims.

DETAILED DESCRIPTION

Figure 1:
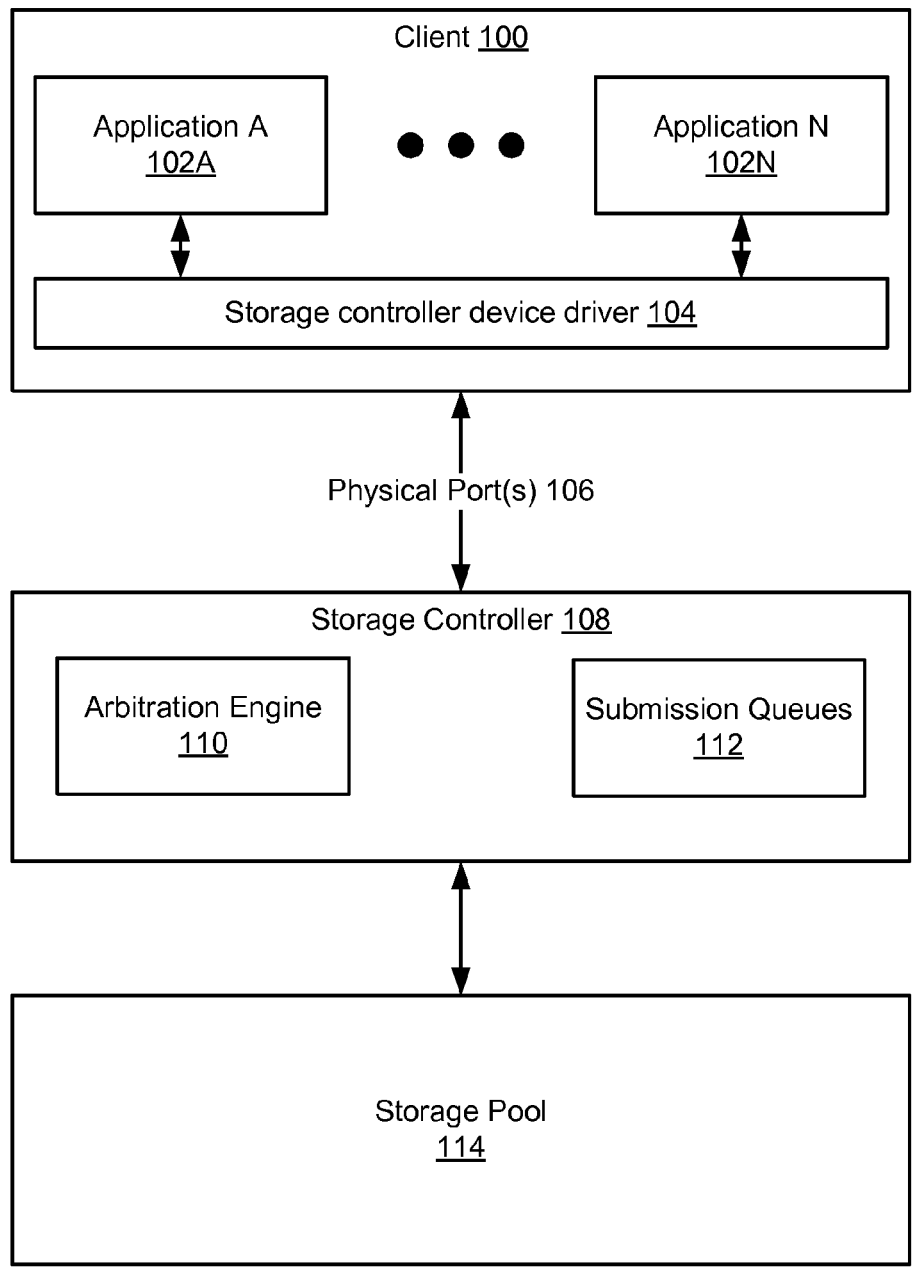
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to creating and using multiple submission queues to process I/O requests, where each of the submission queues is associated with a particular virtual port, queue depth and I/O size range. Further, the determination of the submission queue in which to store each I/O request is handled by the client.

In one or more embodiments of the invention, by providing multiple submission queues and allowing the client to select the submission queue in which to place the I/O request at the time the I/O request is submitted to the storage controller, (i) the storage controller does not need to implement arbitration logic to prevent small I/O requests from unnecessarily blocking larger I/O requests and/or (ii) the storage controller does not need to implement logic to analyze logical objects and their I/O dependency requirements.

For purposes of this invention, an I/O request is a request that specifies a logical address of an object (i.e., data) stored on the client or the logical address of an object stored in memory or persistent storage that is operatively connected to the client. The I/O request may also include other information such as the size of the object. In one embodiment of the invention, the logical address may be an n-tuple: <object ID, offset> or <object ID, offset ID>, where the offset ID is derived from the offset. Any type of logical address may be used without departing from the invention. Examples of I/O requests are read requests (i.e., requests to obtain objects stored in the storage pool) and write requests (i.e., requests to store objects in the storage pool).

FIG. 1 shows a system in accordance with one or more embodiments of the invention. The system includes one or more clients (100) connected to a storage controller (108) via one or more physical ports (106). The storage controller (108) is further operatively connected to a storage pool (114). Each of these components is described below.

In one embodiment of the invention, the client (100) is any physical system that includes functionality to issue I/O requests to the storage controller (108). In one embodiment of the invention, the client (100) may include a processor (not shown), memory (not shown), and persistent storage (not shown). The client (100) further includes functionality to execute one or more applications (102A, 102N). The applications may be user-level applications and/or kernel-level applications. The applications (102A, 102N) are configured to issue I/O requests.

Figure 5:
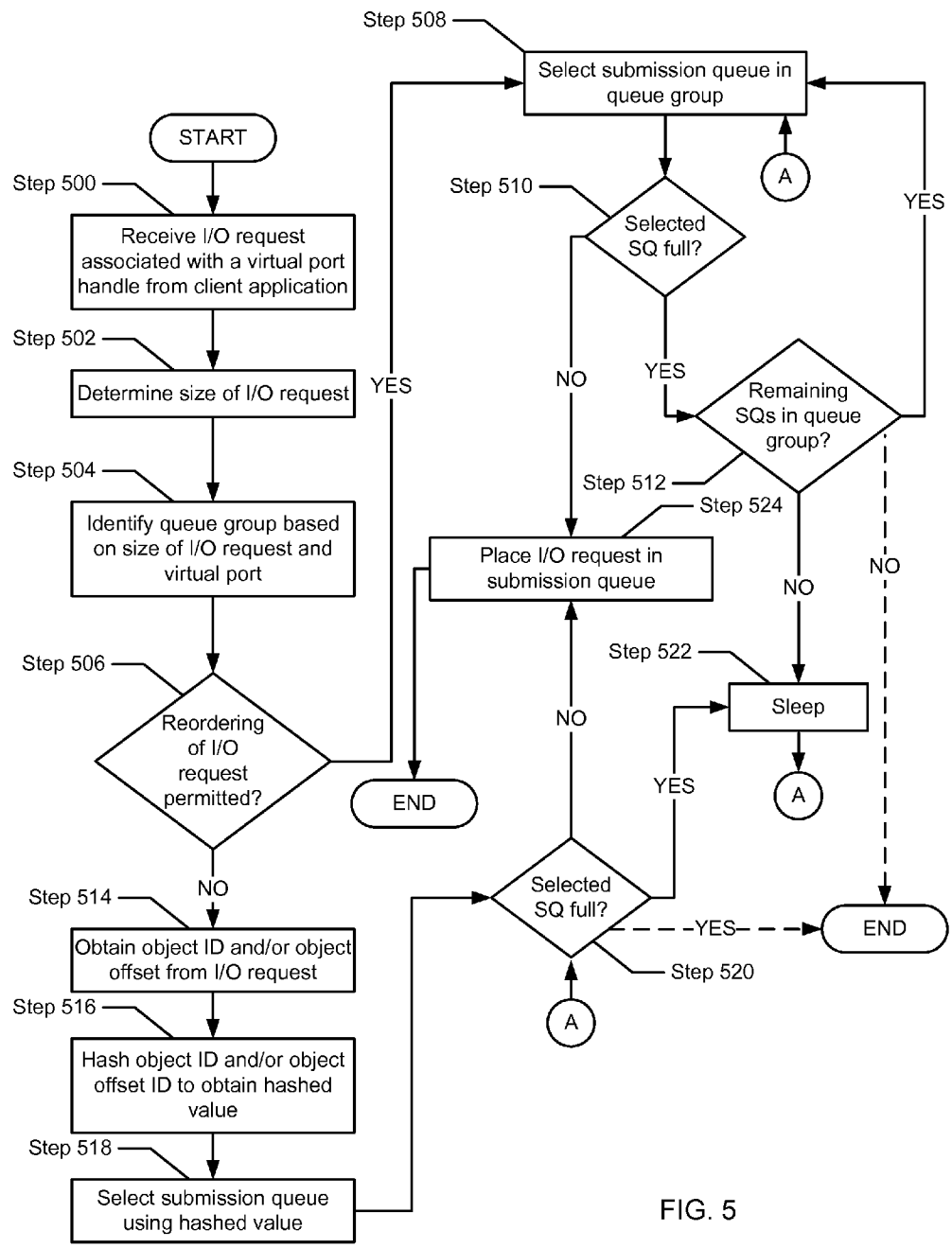
FIG. 5 shows a flowchart for processing a client request in accordance with one or more embodiments of the invention.

The storage controller device driver (SCDD) (104) is configured to receive and process the I/O requests in accordance with the embodiments shown in FIG. 5. The SCDD may provide the client applications with the appropriate virtual port handles (see e.g., FIG. 3 and FIG. 5) to enable the client applications to issue I/O requests to the SCDD. In one embodiment of the invention, the SCDD (104) may be executing in the user-level (as opposed to the kernel-level) of the client (100). Further, the SCDD may also include functionality to map the submission queues (112) to the client application address space thereby creating a unified address space.

As a result, the following storage locations are part of a unified address space: (i) the client memory (not shown) mapped to the client application address space, and (ii) the region(s) of memory in the storage controller in which the submission queues (112) reside. Accordingly, from the perspective of the client, the aforementioned storage locations (while physically separate) appear as a single pool of physical addresses. Said another way, the client may issue I/O requests for objects stored at any of the memory addresses in the unified address space. With this mapping, the client (or a process executing thereon) and/or the SCDD can directly store such an I/O request in a submission queue (112) without requiring any context switching.

In another embodiment of the invention, the SCDD may send (or otherwise provide) the I/O request to the storage controller using one or more hardware registers. In such embodiments, each hardware register may be associated with a particular storage queue and the I/O request may be submitted to the a submission queue by storing the I/O request in a particular hardware register that corresponds to the selected submission queue (see FIG. Step 524).

The SCDD may also include functionality to track the characteristic and state information of one or more submission queues (112). In particular, the SCDD on a particular client may track the status of all submission queues that are associated with the virtual ports being used (or that may be used) by the client applications on the client. The SCDD may track one or more of the following characteristics for each of the aforementioned submission queues: (i) I/O size range (e.g., minimum size, maximum size, an absolute size, minimum and maximum size, etc.) of I/O objects that may be stored in the submission queue and (ii) the queue group with which the I/O queue is associated. Other characteristics may be tracked without departing from the invention. With respect to state information, the SCDD may track: (i) whether the submission queue is full, (ii) depending on the implementation of the submission, the current head and tail of the submission queue, and (iii) whether a given I/O request has been processed. Other state information may be tracked without departing from the invention.

The SCDD may receive characteristic and state information via application programming interfaces (APIs) provided by the storage controller. Alternatively, or additionally, the SCDD may receive the above information by having the storage controller directly store, using the unified address space, the above information in the appropriate SCDD data structures located in the client memory.

In one embodiment of the invention, the physical port (106) corresponds to a hardware interface to which a plug or cable connects and that enables the client and the storage controller to communicate. The I/O requests as well as the information necessary to implement the invention are communicated using the physical port. The type of physical port depends on the communication protocol used between the client and the storage controller. Examples of physical ports include, but are not limited to, Small Computer System Interface (SCSI), Ethernet, IEEE 1394 interface, Fibre Channel (FC), Serially Attached SCSI (SAS), and PCI Express (PCIe).

In one embodiment of the invention, the client (100) is configured to communicate with the storage controller (108) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. The invention is not limited to the aforementioned protocols. The choice of protocol may necessitate the use of a particular type of physical port.

In one embodiment of the invention, the storage controller (108) is configured to implement various embodiments of the invention including, but not limited to, (i) creating submission queues, (ii) queuing I/O requests (see e.g., FIG. 5, step 524), (ii) processing queued I/O requests in the submission queues (see e.g., FIG. 6), and (iii) providing submission queue characteristics and status to the client. In one embodiment of the invention, the arbitration engine (110) is configured to process of I/O requests in the submission queues (see e.g., FIG. 6). In one embodiment of the invention, the storage controller (108) includes a processor (not shown) configured to execute instructions to implement one or more embodiments of the invention, where the instructions are stored on a non-transitory computer readable medium (not shown) that is located within or that is operatively connected to the storage controller (108). Alternatively, the storage controller (108) may be implemented using the integrated circuit including circuits configured to provide the aforementioned functionality. Alternatively, the storage controller (108) may be implemented using an FPGA, an ASIC, other specialized hardware or any combination thereof. The storage controller (108) may be implemented using any combination of software and/or hardware without departing from the invention.

In one embodiment of the invention, the storage pool (114) includes one or more persistent storage devices including, but not limited to, magnetic memory devices, optical memory devices, solid state memory devices, phase change memory devices, any other suitable type of persistent memory device, or any combination thereof.

System configurations other than the one shown in FIG. 1 may be used without departing from the invention.

Figure 2:
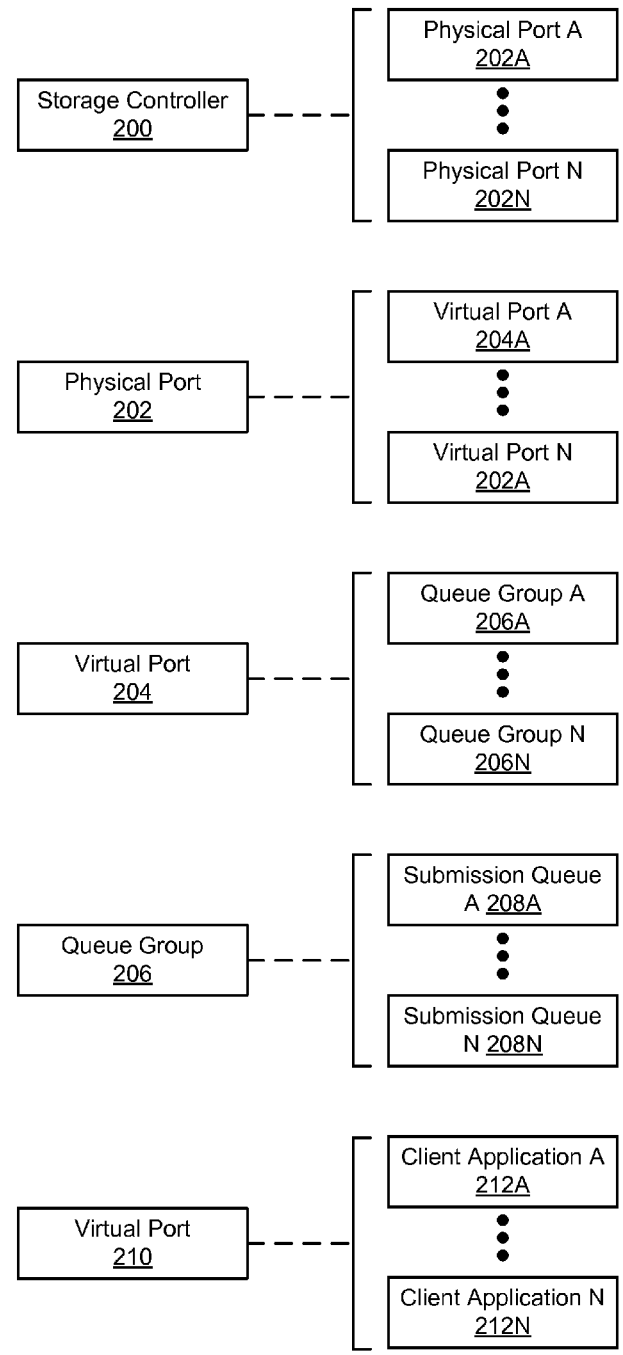
FIG. 2 shows relationship between the various components in the system in accordance with one or more embodiments of the invention.

FIG. 2 shows a relationships between the various components in the system in accordance with one or more embodiments of the invention. Turning to FIG. 2, each storage controller (200) may be associated with one or more physical ports (202A, 202N). Said another way, the storage controller (200) may have multiple physical ports over which it can receive I/O requests. Though not shown in FIG. 2, a client may communicate with a storage controller via multiple physical ports. A client may also communicate with multiple storage controllers using different physical ports.

Each physical port (202) may be associated with one or more virtual ports (204A, 204N). Each virtual port (204A, 204N) may only be associated with a single physical port. A virtual port is a software construct that enables the storage controller to virtualize a physical port. In one embodiment of the invention, each virtual port is associated with a virtual port handle. The virtual port handle is used by the application to specify a virtual port over which to send an I/O request. Those skilled in the art will appreciate that from the perspective of the client (or client application) the virtual port appears as a physical port.

The virtualization of the physical port provides the storage controller with more granular control over the physical port. For example, the storage controller may allocate a portion of the total bandwidth of the physical port to each of the virtual ports. The amount to bandwidth allocated to each virtual port may be set manually and/or determined heuristically by the storage controller. Any mechanism may be used to allocate the bandwidth of the physical port to the various virtual ports without departing from the invention.

Continuing with the discussion of FIG. 2, each virtual port (204) is associated with one or more queue groups (206A, 206N). A queue group (206A, 206N) is a logical collection of submission queues. More specifically, each queue group (206) is associated with one or more submission queues (208A, 208N). The submission queues associated with a given queue group all have the same I/O request size and queue depth. The submission queues may be implemented using a data structure that allows the storage controller to track the order in which the I/O requests are placed in the submission queue. For example, the submission queue may be a First-In First-Out (FIFO) queue. Further, the submission queue may be implemented using a ring buffer. Other implementations of the submission queue may be used without departing from the invention.

As discussed above, each submission queue has a queue depth (i.e., the maximum number of I/O requests that may be stored in the submission queue at any given time) and an I/O request size (i.e., the size of the object to be read to complete the I/O request or a size of the object to be written to complete the I/O request). The I/O request size limits which I/O requests may be placed in the submission queue based on the size of the I/O request. The I/O request size may be specified as follows: (i) I/O request size≥a minimum size, (ii) I/O request size≤a maximum size, (iii) I/O request size=absolute size, or (iv) minimum size≤I/O request size≤maximum size. In one embodiment of the invention, there is a direct relationship between the I/O request size and the queue depth. Said another way, the larger the I/O request size the larger the queue depth and vise versa. The I/O request size and the queue depth for submission queues in a queue group may vary based on the queue group (see e.g., FIG. 4). Finally, each virtual port (210) may be associated with one or more client applications (212A, 212N). For example, a virtual port (210) may be utilized by a single client application or by multiple client applications. The association of a virtual port to a client application may vary based on the implementation.

FIGS. 3-6 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, one or more steps shown in FIGS. 3-6 may be performed in parallel with one or more of the other steps shown in FIGS. 3-6.

Figure 3:
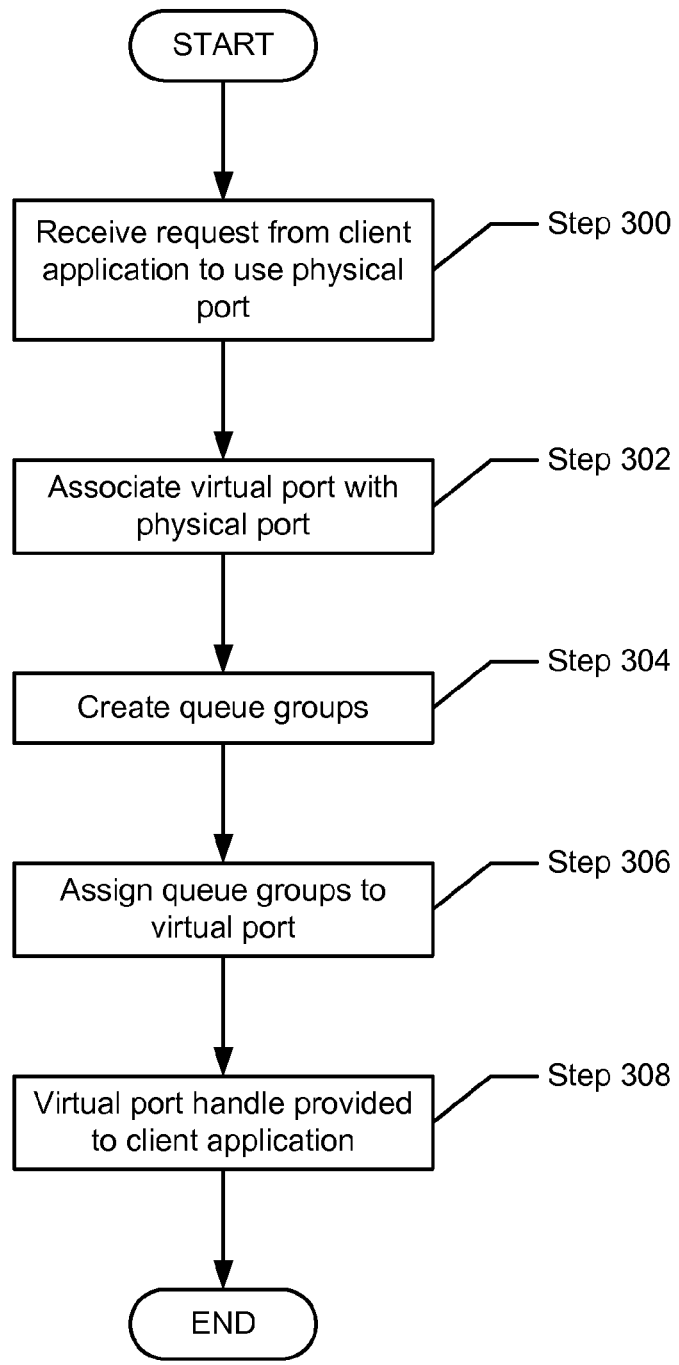
FIGS. 3 and 4 show flowcharts for processing a client request to create queue groups in accordance with one or more embodiments of the invention.
Figure 4:
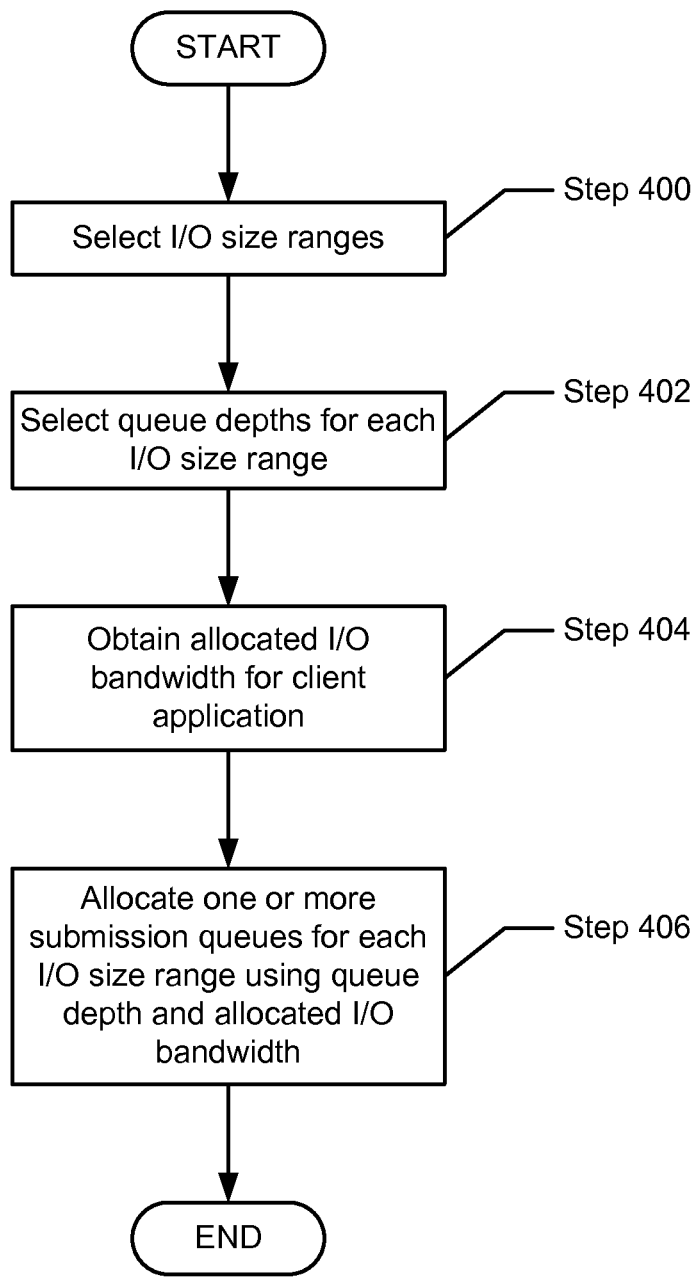

FIGS. 3 and 4 show flowcharts for processing a client request to create queue groups in accordance with one or more embodiments of the invention.

In Step 300, a request to use a physical port is received from a client application. The request is received by the storage controller device driver (SCDD), which subsequently initiates the process to create the queue groups.

In Step 302, a virtual port is created and associated with the physical port. In Step 304, one or more queue groups are created, where each submission queue in the queue group is associated with an I/O request size and queue depth. Additional embodiments related to the creation of the queue groups are described with respect to FIG. 4 below.

In Step 306, one or more queue groups created in Step 304 are assigned to the virtual port. In Step 308, the virtual port handle corresponding to the virtual port created in Step 302 is provided to the client application. At this stage, the client application may use the virtual port handle to specify the virtual port over which to send a given I/O request.

As described above in Step 304, one or more queue groups are created. One or more embodiments of the invention related to the creation of queue groups is described in FIG. 4. Referring to FIG. 4, in Step 400, I/O size ranges are selected. The selection of the I/O size ranges may be determined for example by, (i) using information provided by the client application, (ii) using historical information about the size of I/O requests that the client application has issued in the past, (iii) using default information provided by the storage controller, (iv) any other information that may be used to specify various I/O request sizes, or any combination thereof.

In Step 402, the queue depth for each I/O size range is obtained. In one embodiment of the invention, there is a direct relationship between the I/O request size and the queue depth. Said another way, the larger the I/O request size the larger the queue depth and vise versa.

In Step 404, the allocated I/O bandwidth for the client application is obtained. The allocated I/O bandwidth may be all or a portion of the total I/O bandwidth of the physical port.

In Step 406, one or more submission queues for each I/O size range are allocated using the queue depth and the allocated I/O bandwidth. Said another way, one or more queue groups are created where (i) each queue group includes one or more submission queues with a specific I/O size range and corresponding queue depth and (ii) the number of queue groups and the number of submission queues in each queue group is based on the allocated I/O bandwidth. For example, the queue groups may be created in order to fully utilize the allocated I/O bandwidth. Further, the specific combination of queue groups (each with submission queues of different I/O size ranges and queue depths) may also be determined, in part, by information from the client application and/or historical information about the size of I/O requests that the client application has issued in the past.

For example, consider the scenario in which 80% of the I/O requests issued by the client are between 32B-128B and 20% of the I/O requests are between 16K-64K. In this case, there may be two queue groups—queue group 1 with an I/O size range of 32B-128B and queue group 2 with an I/O size range of 16K-64K—where queue group 1 has significantly more submission queues than queue group 2.

In another embodiment of the invention, the number of submission queues created in step 406 corresponds to the number of threads that may concurrently execute the client application. In such cases, in Step 406, the only determination that is made is how may of the total number of submission queues should be allocated to each I/O size range.

Submission queues may be allocated to queue groups using other methods without departing from the invention.

While the processes shown in FIGS. 3 and 4 is described with respect to the client application triggering the creating of the queue groups, embodiments of the invention may be implemented such that the queue groups are created and associated with a virtual port prior to receiving the request from the client application to use the virtual port. In such cases, the SCDD does not need to trigger steps to create the queue groups in response to receiving the request; instead the SCDD only needs to provide the appropriate virtual port handle to the client application. In other scenarios, the SCDD may create the queue groups and provide the appropriate virtual port handle to the client applications prior to any request for the client application. Accordingly, in this scenario, when the client application issues an I/O request, the I/O request will include the appropriate virtual port handle that was previously provided to the client application.

FIG. 5 shows a flowchart for processing a client request in accordance with one or more embodiments of the invention. The process described in FIG. 5 may be performed by the storage controller device driver in one or more embodiments of the invention.

In Step 500, an I/O request associated with a virtual port handle is received from the client application.

In Step 502, the size of the I/O request is determined. As discussed above, the size of the I/O request corresponds to the size of the object to be read to complete the I/O request or a size of the object to be written to complete the I/O request.

In Step 504, a queue group is identified, where the identification of the queue group is based on the virtual port handle and the size of the I/O request. More specifically, the virtual port handle is used to identify the virtual port. Once the virtual port is identified, the characteristics of the queue groups associated with the virtual port are analyzed to determine which of the queue groups has an I/O size range that matches the size of the I/O request. "Matching" as used in this context includes determine whether the size of the I/O request satisfies the I/O size range associated with the queue group.

In Step 506, a determination is made about whether the I/O request may be reordered. In one embodiment of the invention, this determination is made by (i) identifying the object that is the subject of the I/O request and (ii) determination using information from the client application and/or information maintained by the SCDD that the I/O request must be processed by the arbitration engine after a currently queued I/O request. Because the arbitration engine does not include functionality and/or the necessary information to make this determination, this ordering may only be enforced by placing the I/O request in the same submission queue as the currently queued I/O request. Accordingly, if the I/O request may be reordered the process proceeds to Step 508; otherwise the process proceeds to Step 514.

In Step 508, a submission queue in the queue group identified in Step 504 is selected. The submission queue may be selected using a round robin algorithm, arbitrarily selecting one of the submission queues in the queue group, or selecting the submission queue that includes the least number of queued I/O requests. Other algorithms or schemes for selecting the submission queue may be used without departing from the invention.

In Step 510, a determination is made about whether the selected submission queue (SQ) is full. This determination may be made using the status of the submission queues provided by the storage controller. If the selected submission queue (SQ) is full the process proceeds to Step 512; otherwise the process proceeds to Step 524.

In Step 512, a determination is made about whether there are remaining submission queues in the queue group in which the I/O request may be queued. If there are remaining submission queues in the queue group in which the I/O request may be queued, the process proceeds to Step 508; otherwise the process may proceed to Step 522 or end.

In Step 514, the object ID and/or offset ID is obtained (or otherwise derived) from the I/O request. The I/O request may include the offset and that the offset ID may be obtained by applying a bitmask to the offset. In addition, the offset may be used instead of the offset ID without departing from the invention. Further, any information that uniquely identified the object in the storage pool may be used without departing from the invention.

In Step 516, a hash function is applied to the object ID and/or offset ID to obtained a hashed value. Any injective function may be used without departing from the invention.

In Step 518, the submission queue is selected based on the hashed value. Any function that maps the hash value of a submission queue may be used without departing from the invention provided that the function always maps the hash value to the same submission queue.

In Step 520, a determination is made about whether the selected submission queue (SQ) is full. This determination may be made using the status of the submission queues provided by the storage controller. If the selected submission queue (SQ) is full the process proceeds to Step 522 or ends; otherwise the process proceeds to Step 524.

In Step 522, the process (e.g., a process associated with the SCDD) that is handling the placement of the I/O request in the appropriate submission queue sleeps for a predetermined period of time and the proceeds to either Step 508 or Step 520.

In Step 524, the I/O request is placed in the submission queue using submission queue information. The manner in which Step 524 is achieved may vary based on the implementation of the invention. In one embodiment of the invention, if the SCDD has mapped the submission queues to the client application address space, the SCDD may directly store the I/O request in the selected submission queue by storing the I/O request in a memory address that is in a region of the client application address space that is mapped to the submission queue. In this embodiment submission queue information includes the aforementioned memory address.

In another embodiment of the invention, the SCDD stores the I/O request in the selected submission queue as follows: (i) obtaining a memory location in the storage controller memory where the memory location is associated with the selected submission queue, (ii) directly storing the I/O request in the memory location, and (iii) updating a hardware register in the storage controller with a new memory location, where the new memory location corresponds to the next available memory location in the submission queue that an I/O request may be stored. In this embodiment, the submission queue information includes the memory location in the storage controller memory and a pointer to the hardware register, where the SCDD uses the pointer to store the new memory location in the hardware register. Further, by updating memory location stored in the hardware register (i.e., (iii) above), the SCDD signals to the storage controller that a new I/O request has been placed in the submission queue. In one embodiment of the invention, the SCDD is able to directly store the I/O request in the storage controller memory because memory location in the storage controller memory is part of the client application address space.

Other mechanisms for storing the I/O request in the selected submission queue may be used without departing from the invention.

Figure 6:
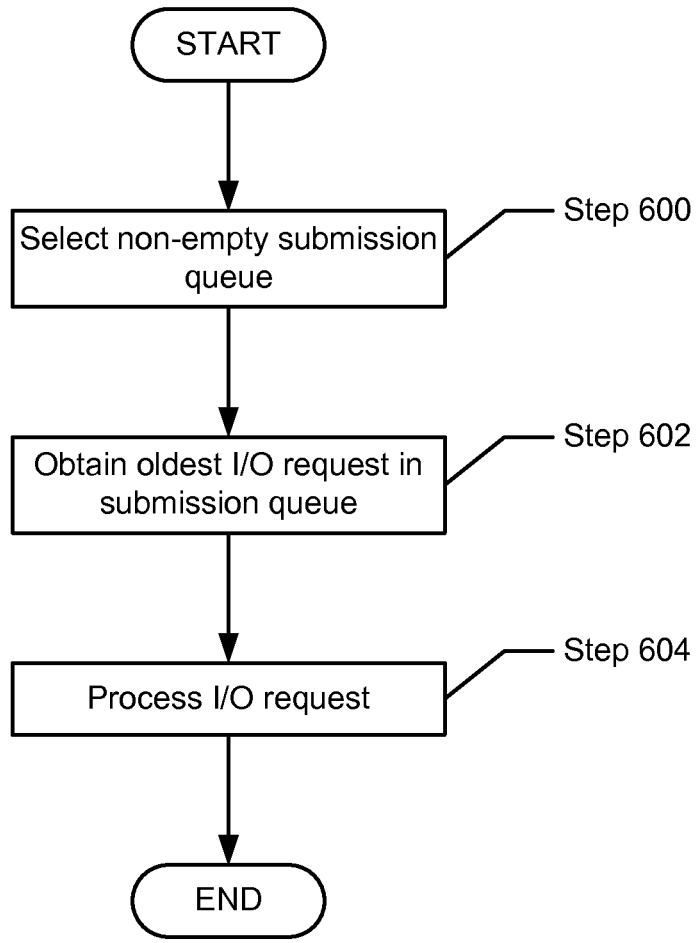
FIG. 6 shows a flow chart for processing I/O requests in queue groups in accordance with one or more embodiments of the invention.

FIG. 6 shows a flow chart for processing I/O requests in queue groups in accordance with one or more embodiments of the invention. In one embodiment of the invention, the arbitration engine in the storage controller is configured to perform the process shown in FIG. 6.

In Step 600, a non-empty submission queue is selected. The arbitration engine may include functionality to prioritize the submission queues and process the submission queues based on the priority. In Step 602, the oldest I/O request in the submission queue is obtained. The arbitration engine does not include any functionality to select a queued I/O request other than the oldest queued I/O request from the particular submission queue. Said another way, the arbitration engine does not include functionality to determine the order in which to process I/O requests queued in a given submission queue; rather, the arbitration engine may only process the I/O requests in the order in which they appear in the submission queue. In Step 604, the I/O request is processed. Processing the I/O request may include writing the object to the storage pool or reading an object from the storage pool. In one embodiment of the invention, the storage controller may include functionality to concurrently process I/O requests. In such cases, the various steps in FIG. 6 may be performed concurrently by different processes executing on the storage controller.

Figure 7:
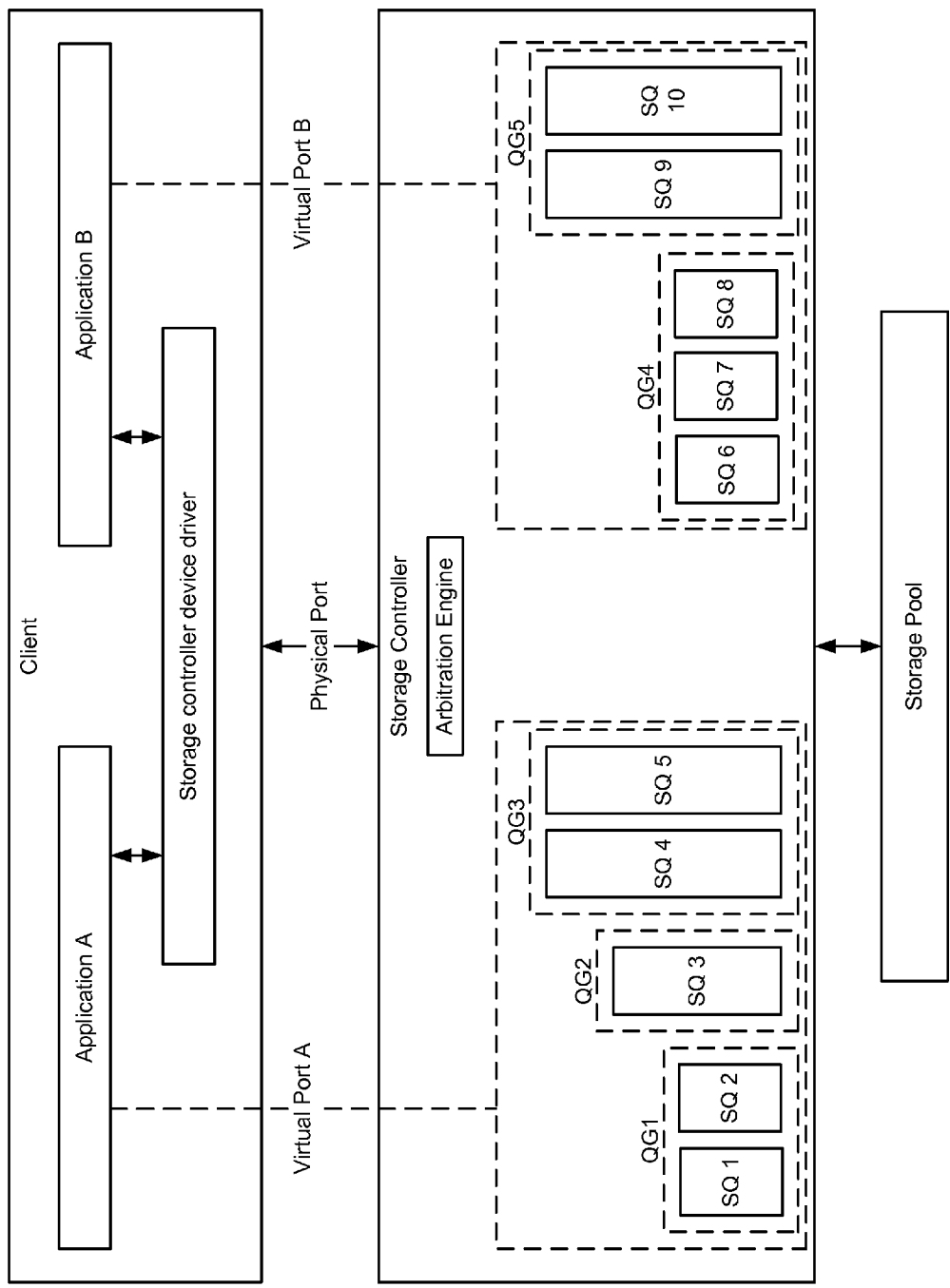
FIG. 7 shows an example of a system implementing one or more embodiments of the invention.

FIG. 7 shows an example of a system implementing one or more embodiments of the invention. The example is not intended to limit the scope of the invention. Further, various components in the client and storage appliance have been omitted for purposes of clarity in the FIG. 7.

Referring to FIG. 7, the client includes two client applications (application A, application B) both sending I/O requests to the storage controller via a single physical port. While the client applications use the same physical port, the client applications are only able to interact the with physical port via the virtual port handles provided by the storage control device driver. Further, the client applications are only able to store I/O requests in submission queues associated with the virtual port that has been provided, via the virtual port handle, to the client application.

By implementing embodiments of the invention, the system shown in FIG. 7 has a mechanism by which the physical port can be virtualized using the two virtual ports (virtual port A, virtual port B). Once the physical port has been virtualized, portions of the total I/O bandwidth of the physical port can be allocated to each of the client applications where the enforcement of the allocated I/O bandwidth is achieved by allocating a finite number of submission queues that enable the client application to fully utilize its allocated I/O bandwidth. In this manner, the client application cannot utilize more than its allocated I/O bandwidth because the client application cannot queue more I/O requests than permitted by the submission queues allocated to the corresponding virtual port.

In addition, allocating submission queues in order to fully saturate the I/O bandwidth involves creating queue groups each with one or more submission queues, where the submission queues in each queue group have the same I/O size range and queue depth. Because the size distribution of I/O requests issued by client applications varies, embodiments of the invention permit the creation of queue groups that not only allow for full saturation of the allocated I/O bandwidth but that also take into account the size distribution of I/O requests issued by client application associated with the particular virtual port. Returning to FIG. 7, application A is allocated five submission queues (SQ 1, SQ 2, SQ 3, SQ 4, SQ 5) divided across three queue groups (QG1, QG2, QG3). Application B is also allocated five submission queues (SQ 6, SQ 7, SQ 8, SQ 9, SQ 10); however, because the size distribution of I/O requests is different as compared with application A, the five submission queues allocated to application B are divided across two queue groups (QG 4, QG 5).

While the virtual ports are allocated to unique sets of submission queues, there may be submission queues allocated to each of the virtual ports that have the same I/O size range and queue depth. In FIG. 7, SQ 1, SQ 2, SQ 6, SQ 7, and SQ 8 all have the same I/O size range and queue depth. Further, SQ 4, SQ 5, SQ 9, and SQ 10 all have the same I/O size range and queue depth.

Figure 8:
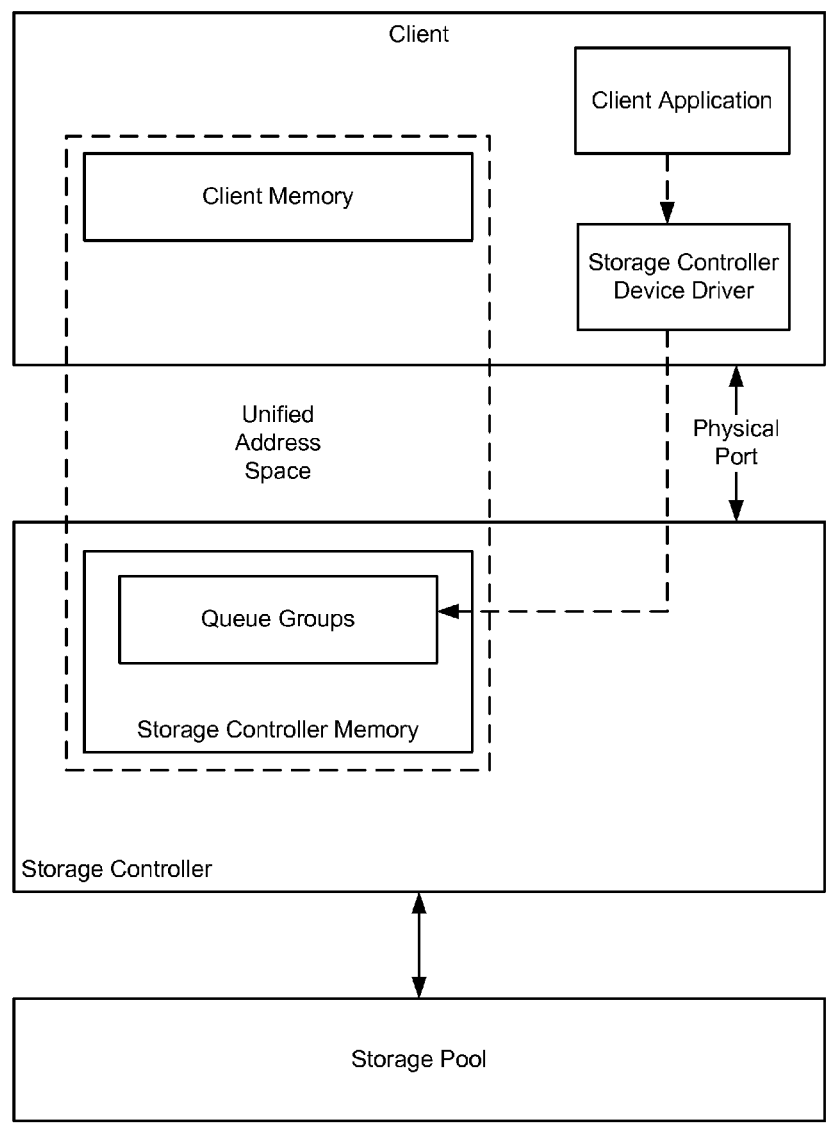
FIG. 8 shows an example of a system implementing one or more embodiments of the invention.

FIG. 8 shows an example of a system implementing one or more embodiments of the invention. The example is not intended to limit the scope of the invention. Further, various components in the client and storage appliance have been omitted for purposes of clarity in the FIG. 8.

Turning to FIG. 8, FIG. 8 shows how the client application may store an I/O request directly into a submission queue (not shown) in a queue group. More specifically, the storage controller device driver (SCDD) maps the queue groups (which include the submission queues) to the client application address space. Once the mapping is complete, a single unified address space that bridges the client memory and the storage controller memory.

Further, the unified address space allows the client application to directly store the I/O request in the appropriate submission queue without requiring any context switching. More specifically, the client application may issue an I/O request to the storage controller. The I/O request is subsequently received by the SCDD. Once the SCDD determines the submission queue (see FIG. 5), the SCDD (or a related process) stores the I/O request in a memory address in the unified address space corresponding to the selected submission queue. More specifically, the aforementioned memory address is mapped to a location in the storage controller memory that corresponds to the submission queue. For example, if the submission queue is implemented as a ring buffer, then the location in the storage controller memory may be the location of the tail of the ring buffer.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data to submission queues in a storage controller, comprising:

receiving a first input/output (I/O) request from a client application, wherein the client application is associated with a virtual port and wherein the virtual port is associated with a physical port;

determining a size of the first I/O request;

identifying a queue group based on the size of the first I/O request and the virtual port, wherein the queue group consists of a plurality of submission queues, wherein the queue group is associated with the virtual port;

identifying a submission queue in the plurality of submission queues, wherein the submission queue is not full and wherein identifying the submission queue comprises:

making a first determination that reordering of the first I/O request is permitted;

based on the first determination, making a second determination about which of the plurality of submission queues are non-full to obtain a set of non-full submission queues; and based on the second determination, selecting one of the set of non-full submission queues, wherein the submission queue is one of the set of non-full submission queues;

sending the first I/O request to a storage controller over the physical port, wherein the queue group is located in memory operatively connected to the storage controller, wherein the storage controller is configured to place the first I/O request in the submission queue.

2. The method of claim 1, further comprising:

receiving a second I/O request from a second client application, wherein the second client application is associated with a second virtual port;

determining a size of the second I/O request;

identifying a second queue group based on the size of the second I/O request and the second virtual port, wherein the second queue group consists of a second plurality of submission queues, wherein the second queue group is associated with the second virtual port;

identifying a second submission queue in the second plurality of submission queues, wherein the second submission queue is not full;

sending the second I/O request to the storage controller over the physical port, wherein the second queue group is located in the memory operatively connected to the storage controller, wherein the storage controller is configured to place the second I/O request in the second submission queue, and wherein the second virtual port is associated with the physical port.

3. The method of claim 1, further comprising:

prior to receiving the first I/O request:

receiving, by the client, a virtual port handle associated with the first virtual port, wherein the client application provides the virtual port handle with the first I/O request.

4. The method of claim 1, wherein determining the size of the first I/O request comprises determining at least one selected from a group consisting of an amount of data to be read to complete the first I/O request and an amount of data to be written to complete the first I/O request.

5. The method of claim 1, wherein the submission queue is located in a region of the memory that is mapped to a client application address space, wherein the first I/O request is stored in the submission queue using submission queue information, and wherein the submission queue information specifies a memory address in the client application address space corresponding to a physical location in the region of memory.

6. The method of claim 1, wherein the submission queue is located in a region of the memory, wherein sending the first I/O request to the storage controller comprises directly storing the first I/O request in the region of the memory, wherein the first I/O request is stored in the submission queue using submission queue information, and wherein the submission queue information specifies a memory address in a client application address space corresponding to a physical location in the region of memory.

7. The method of claim 1, wherein the submission queue is located in a region of the memory, wherein sending the first I/O request to the storage controller comprises directly storing the first I/O request in the region of the memory and updating a hardware register in the storage controller with a new memory address, wherein the new memory address specifies a next available memory address in the submission queue in which to store a subsequent I/O request for the submission queue, and wherein the new memory address is in a client application address space.

8. The method of claim 1, wherein selecting one of the set of non-full submission queues comprises at least one selected from a group consisting of selecting the submission queue using a round robin algorithm, arbitrarily selecting one of the set of non-full submission queues, and selecting the submission queue as the submission queue in the set of non-full submission queues that includes a least number of queued I/O requests.

9. A method for writing data to submission queues in a storage controller, comprising:

receiving an input/output (I/O) request from a client application, wherein the client application is associated with a virtual port and wherein the virtual port is associated with a physical port;

determining a size of the I/O request;

identifying a queue group based on the size of the I/O request and the virtual port, wherein the queue group consists of a plurality of submission queues, wherein the queue group is associated with the virtual port;

identifying a submission queue in the plurality of submission queues, wherein the submission queue is not full and wherein identifying the submission queue comprises:

making a determination that reordering of the I/O request is not permitted;

based on the determination:

hashing at least one selected from a group consisting of an object ID and an offset ID to obtain a hashed value, wherein the I/O request specifies data associated with the object ID and the offset ID, and selecting the submission queue using the hashed value; and sending the I/O request to a storage controller over the physical port, wherein the queue group is located in memory operatively connected to the storage controller, wherein the storage controller is configured to place the I/O request in the submission queue.

10. The method of claim 9, further comprising:

prior to receiving the I/O request:

receiving, by the client, a virtual port handle associated with the virtual port, wherein the client application provides the virtual port handle with the I/O request.

11. The method of claim 9, wherein determining the size of the I/O request comprises determining at least one selected from a group consisting of an amount of data to be read to complete the I/O request and an amount of data to be written to complete the I/O request.

12. The method of claim 9, wherein the submission queue is located in a region of the memory that is mapped to a client application address space, wherein the I/O request is stored in the submission queue using submission queue information, and wherein the submission queue information specifies a memory address in the client application address space corresponding to a physical location in the region of memory.

13. The method of claim 9, wherein the submission queue is located in a region of the memory, wherein sending the I/O request to the storage controller comprises directly storing the I/O request in the region of the memory, wherein the I/O request is stored in the submission queue using submission queue information, and wherein the submission queue information specifies a memory address in a client application address space corresponding to a physical location in the region of memory.

14. The method of claim 9, wherein the submission queue is located in a region of the memory, wherein sending the I/O request to the storage controller comprises directly storing the I/O request in the region of the memory and updating a hardware register in the storage controller with a new memory address, wherein the new memory address specifies a next available memory address in the submission queue in which to store a subsequent I/O request for the submission queue, and wherein the new memory address is in a client application address space.

\* \* \* \* \*